(12) United States Patent
Asher

(10) Patent No.: US 8,825,812 B2
(45) Date of Patent: Sep. 2, 2014

(54) METHOD AND SYSTEM FOR PEER-TO-PEER IMAGE STREAMING

(71) Applicant: Oren Asher, Markham (CA)

(72) Inventor: Oren Asher, Markham (CA)

( * ) Notice: Subject to any disclaimer, the term of this patent is extended or adjusted under 35 U.S.C. 154(b) by 0 days.

(21) Appl. No.: 13/747,403

(22) Filed: Jan. 22, 2013

(65) Prior Publication Data
US 2013/0132527 A1  May 23, 2013

Related U.S. Application Data

(63) Continuation of application No. 09/976,169, filed on Oct. 11, 2001, now abandoned.

(51) Int. Cl.
*G06F 15/16* (2006.01)
*H04L 29/08* (2006.01)

(52) U.S. Cl.
CPC .................. *H04L 67/104* (2013.01)
USPC ........... 709/219; 709/203; 709/205; 709/218; 709/225; 713/153

(58) Field of Classification Search
USPC ......... 709/203, 205, 218, 219, 225, 231, 232, 709/237
See application file for complete search history.

(56) References Cited

U.S. PATENT DOCUMENTS

| | | | |
|---|---|---|---|
| 6,345,288 B1 | 2/2002 | Reed et al. | |
| 6,535,228 B1 * | 3/2003 | Bandaru et al. | 715/752 |
| 6,757,684 B2 * | 6/2004 | Svendsen et al. | 1/1 |
| 7,047,406 B2 * | 5/2006 | Schleicher et al. | 713/168 |
| 2002/0049760 A1 * | 4/2002 | Scott et al. | 707/10 |
| 2002/0103998 A1 | 8/2002 | DeBruine | |
| 2006/0107297 A1 | 5/2006 | Toyama | |

* cited by examiner

*Primary Examiner* — Glenford Madamba
(74) *Attorney, Agent, or Firm* — Alex Porat

(57) ABSTRACT

A peer-to-peer image streaming system including a sharer computer including a transmitter for sending a message including a web address, a peer-to-peer image streamer for streaming image data over a network, an image store for storing digital images, a viewer computer including a peer-to-peer image viewer for interactively viewing image data over a network, and a receiver for receiving the message including the web address from the sharer computer, and a community server including an address translator for looking up an address of an image in the image store, based on the web address, and a peer-to-peer network connector connecting the peer-to-peer image streamer with the viewer computer, so that the viewer computer can interactively view the image in the image store. A method is also described and claimed.

5 Claims, 10 Drawing Sheets

METHOD AND SYSTEM FOR PEER-TO-PEER IMAGE STREAMING

FIELD OF THE INVENTION

The present invention relates to sharing of digital images and remote interactive viewing thereof.

BACKGROUND OF THE INVENTION

Peer-to-peer networking involves direct socket connections between one computer and another for requesting and receiving data. Peer-to-peer networking differs fundamentally from conventional server-client distribution systems, in that peer-to-peer networking sets up connections between any two client computers and transfers data therebetween, rather than upload and download data through a central server.

A first client computer that has files to share can elect to make them visible to a network of computers. A second client computer can then explore the files over the network, and transfer them from the first client computer to the second client computer using a protocol, such as the conventional file transfer protocol (FTP).

Peer-to-peer networking is used to share and exchange text documents and multi-media files, such as audio and video files.

SUMMARY OF THE INVENTION

The present invention provides a peer-to-peer method and system for image streaming and interactive image viewing. Interactive image viewing involves navigating through a high quality image by viewing successive portions of the image at successive resolutions, within a view window. High quality images are typically too large to display at full resolution within a view window. Instead, the user can either view the entire image at a low resolution, or a portion of the image at a higher resolution. As a viewer pans and zooms around to inspect an image by moving the view window left, right, up and down within the full image, and zooms in and out to magnify and reduce the image, corresponding portions of the image are displayed in the view window.

Streaming refers to a technology for delivering media data from a first computer to a second computer in such a way that the viewer can play the media on the second computer as the data is being received, without the need to wait for a complete download of all the media data. Image streaming involves delivering just enough image pixel data to the second computer in order for the viewer to view the specific image portion at the specific resolution that he requests.

The present invention provides for a central community server that maintains a look up table of IP addresses for registered computers that wish to share images. The look up table is used to re-direct viewer computers from the community server to a current IP address for the computer that hosts the shared images.

There is thus provided in accordance with a preferred embodiment of the present invention a peer-to-peer image streaming system including a sharer computer including a transmitter for sending a message including a web address, a peer-to-peer image streamer for streaming image data over a network, an image store for storing digital images, a viewer computer including a peer-to-peer image viewer for interactively viewing image data over a network, and a receiver for receiving the message including the web address from the sharer computer, and a community server including an address translater for looking up an address of an image in the image store, based on the web address, and a peer-to-peer network connector connecting the peer-to-peer image streamer with the viewer computer, so that the viewer computer can interactively view the image in the image store.

There is further provided in accordance with a preferred embodiment of the present invention a method for peer-to-peer image streaming including sending a message from a sharer computer to a viewer computer, the message containing a web address for an image, translating the web address into an address for an image, connecting a peer-to-peer image server with the viewer computer, and interactively viewing the image at the viewer computer.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
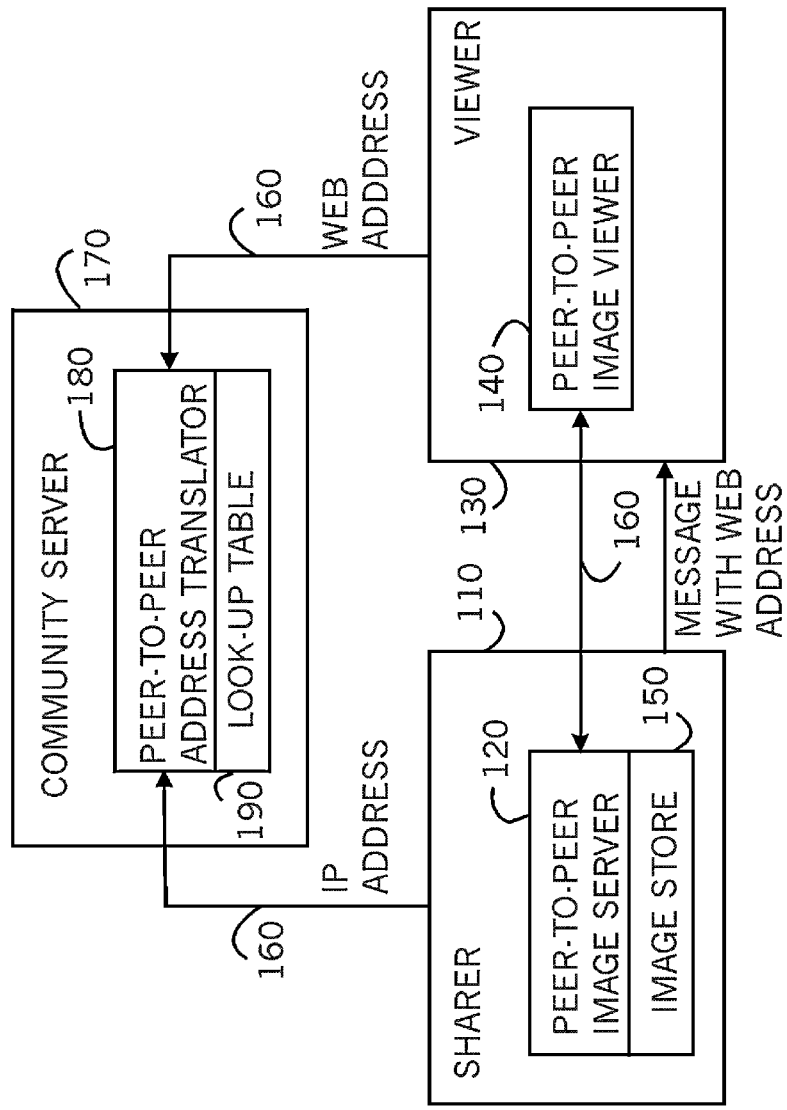
FIG. 1 is a simplified block diagram of a first peer-to-peer image streaming system architecture, in accordance with a preferred embodiment of the present invention.

Reference is now made to FIG. 1, which is a simplified block diagram of a first peer-to-peer image streaming system architecture, in accordance with a preferred embodiment of the present invention. Shown in FIG. 1 is a sharer computer 110 including a peer-to-peer image server 120. Sharer computer 110 is a client computer, operated by a user referred to as a "sharer." Also shown in FIG. 1 is a viewer computer 130 including a peer-to-peer image viewer 140. In a preferred embodiment of the present invention, viewer 140 is a Java applet. Viewer computer 130 is also a client computer, operated by a user referred to as a "viewer." Sharer computer 110 and viewer computer 130 are part of a network of computers connected by network connections 160.

Sharer computer and viewer computer may be conventional desktop computers, laptop computers, hand-held computing devices such as personal data assistants (PDA), wireless devices, set-top boxes or Internet appliances. As such, the various connections shown in FIG. 1, and in FIG. 2-5 that follow, may be wired or wireless connections.

Sharer computer 110 stores digital images that the sharer desires to share with the viewer, in an image store 150. Specifically, the sharer desires to enable viewer computer 130 to interactively view images in image store 150.

In a preferred embodiment of the present invention, sharer computer 110 sends a message to viewer computer 130, the message including one or more web addresses for one or more images residing in image store 150. If viewer computer 130 does not yet have peer-to-peer image viewer 140, then sharer computer 110 includes viewer 140 within the message being sent. The one or more web addresses in the message do not point directly to sharer computer 110, but instead point to a community server 170. Community server 170 is also part of the network of computers, and is connected to both sharer computer 110 and viewer computer 130 by network connections 160. Community server 170 includes a peer-to-peer address translator 180 that looks up an IP address for peer-to-peer image server 120 based on the web address. After identifying the IP address for peer-to-peer image server 120, community server 170 instructs sharer computer 110 to open a direct peer-to-peer socket connection between sharer computer 110 and viewer computer 130.

In order to receive peer-to-peer image server 120, sharer computer 110 preferably registers with community server 170. Community server 170 provides to sharer computer 110 the peer-to-peer image server 120, as well as the peer-to-peer image viewer 140, which sharer computer 110 can then use on its own and distribute to viewer computers of its choice.

It should be noted that typically sharer computer 110 may not have a static IP address, and as such its IP address is dynamic, and changes every time sharer computer 110 connects to the network. In order to be able to identify a correct IP address, community server 170 must be aware of the IP address of peer-to-peer image server 120 at all times that sharer computer 110 is active on the network. In a preferred embodiment of the present invention, after registering with community server 170, sharer computer 110 is able to notify community server 170 of its current IP address, whenever sharer computer 110 is active on the network.

Preferably, sharer computer 110 notifies community server of its identity and its current IP address, so that community server 170 can associate the IP address with peer-to-peer image server 120. In this way community server 170 can maintain a look-up table 190 of peer-to-peer image servers 120 and their current IP addresses. Look-up table 190 enables peer-to-peer address translator 180 to direct viewers to appropriate peer-to-peer image servers. Thus when community server 170 receives the web address from viewer computer 130, it can look up the appropriate IP address for peer-to-peer image server 150 therefrom.

For reasons of privacy, the web address send in the message from sharer computer 110 to viewer computer 130 may contain an alias for peer-to-peer image server, rather than a direct identifier.

It may be appreciated by those skilled in the art that an advantage of using a community server is control of operation of the peer-to-peer image streaming system, since peer-to-peer connections between a sharer computer and a viewer computer must be permitted by the community server. This enables the community server to enforce digital rights management, according to access control instructions received by sharer computers.

It may be appreciated by those skilled in the art that peer-to-peer image server 120 and image store 150 need not reside on sharer computer 130, but may instead reside on a different computer. This leads to various alternatives to the system architecture depicted in FIG. 1.

Figure 2:
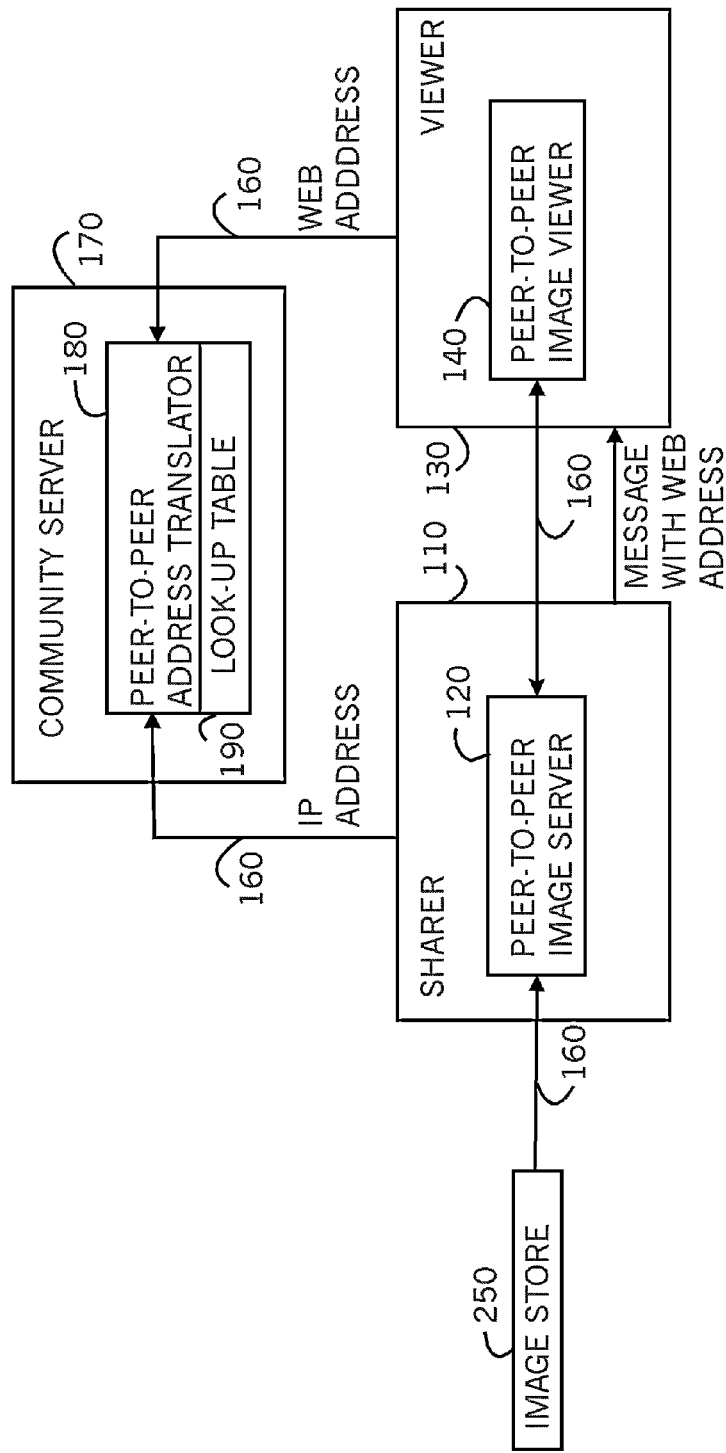
FIG. 2 is a simplified block diagram of a second peer-to-peer image streaming system architecture, in accordance with a preferred embodiment of the present invention.

Reference is now made to FIG. 2, which is a simplified block diagram of a second peer-to-peer image streaming system architecture, in accordance with a second embodiment of the present invention. FIG. 2 differs from FIG. 1 in that image store 250 resides elsewhere than sharer computer 110. Peer-to-peer image server 120 accesses image store 250 in order to stream image data to viewer computer 130.

Figure 3:
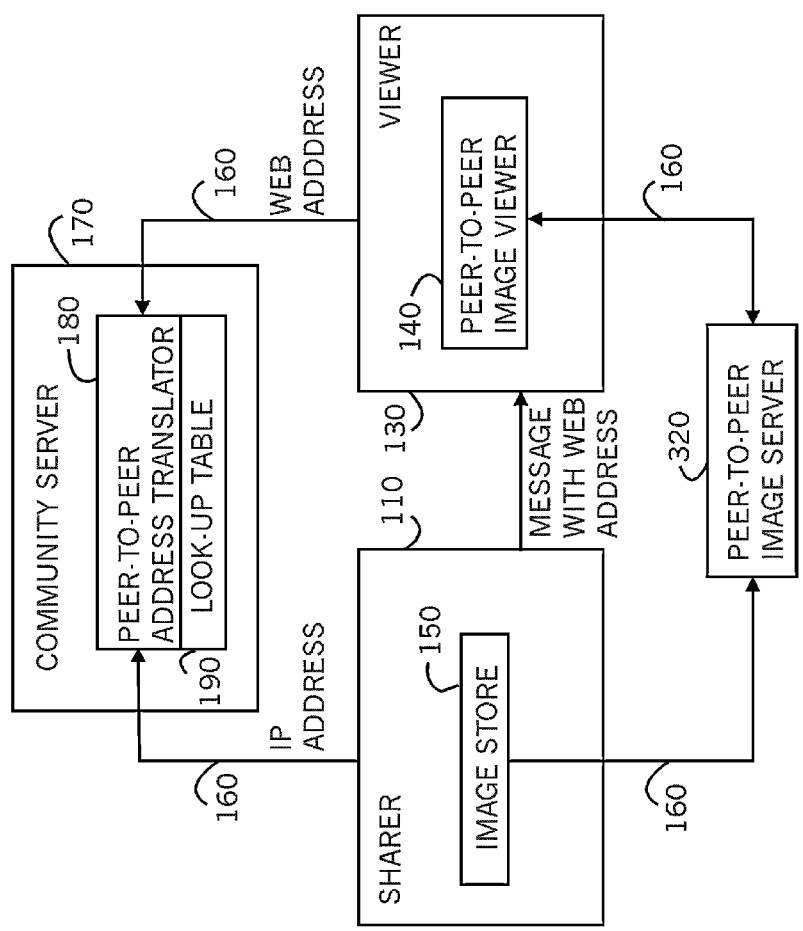
FIG. 3 is a simplified block diagram of a third peer-to-peer image streaming system architecture, in accordance with a preferred embodiment of the present invention.

Reference is now made to FIG. 3, which is a simplified block diagram of a third peer-to-peer image streaming system architecture, in accordance with a third embodiment of the present invention. FIG. 3 differs from FIG. 1 in that peer-to-peer image server 320 resides elsewhere than sharer computer 110. In this embodiment, community server 170 instructs peer-to-peer image server 320 to open a direct peer-to-peer socket connection between peer-to-peer image server 320 and viewer computer 130. Peer-to-peer image server 320 access image store 150 on sharer computer 110 in order to steam image data to viewer computer 130.

Figure 4:
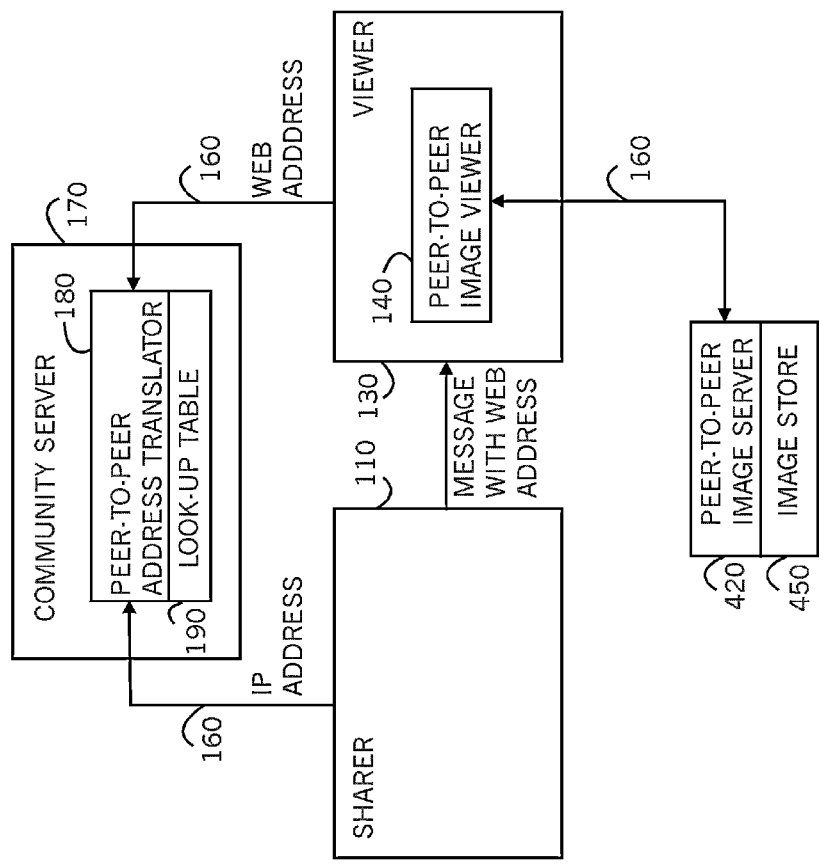
FIG. 4 is a simplified block diagram of a fourth peer-to-peer image streaming system architecture, in accordance with a preferred embodiment of the present invention.

Reference is now made to FIG. 4, which is a simplified block diagram of a fourth peer-to-peer image streaming system architecture, in accordance with a fourth embodiment of the present invention. FIG. 4 differs from FIG. 1 in that both peer-to-peer image server 420 and image store 450 reside elsewhere than sharer computer 110. In this embodiment, community server 170 instructs peer-to-peer image server 420 to open a direct peer-to-peer socket connection between peer-to-peer image server 420 and viewer computer 130.

The system architecture in FIG. 4 is advantageous when the sharer wants the images in image store 450 wants his images to be available without being responsible for ensuring that sharer computer 110 is always actively connected to the network.

Figure 5:
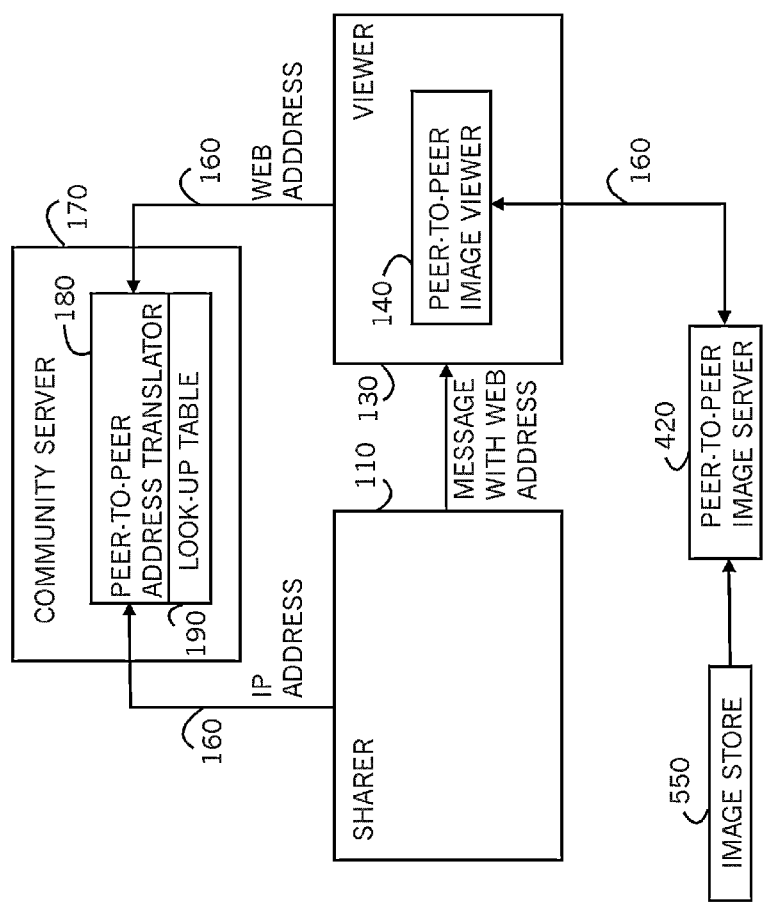
FIG. 5 is a simplified block diagram of a fifth peer-to-peer image streaming system architecture, in accordance with a preferred embodiment of the present invention.

Reference is now made to FIG. 5, which is a simplified block diagram of a fifth peer-to-peer image streaming system architecture, in accordance with a fifth embodiment of the present invention. FIG. 5 differs from FIG. 4 in that image store 550 resides elsewhere than peer-to-peer image server 520.

It may be appreciated by those skilled in the art that the present invention includes system architectures other than those illustrated in FIGS. 1-5. For example, the peer-to-peer image server and/or the image store may be resident in both sharer computer 110 and also in another computer. Thus, for example, a combination of the architectures in FIGS. 1 and 4 can be used to enables viewers to interactively view images on sharer computer 110 and also on another computer as a reliable backup. Such architectures with multiple peer-to-peer image servers and/or multiple image stores can be designed to ensure fault tolerance.

In all of the system architectures described, community server 170 preferably maintains a look-up table 190 of peer-to-peer image servers and their IP addresses, so as to be able to direct viewers to the appropriate image servers. Preferably, peer-to-peer image servers notify community server 170 of their identities and current IP addresses whenever they are actively connected to the network. Community server 170 uses this information to update look-up table 190 and keep it current.

Figure 6:
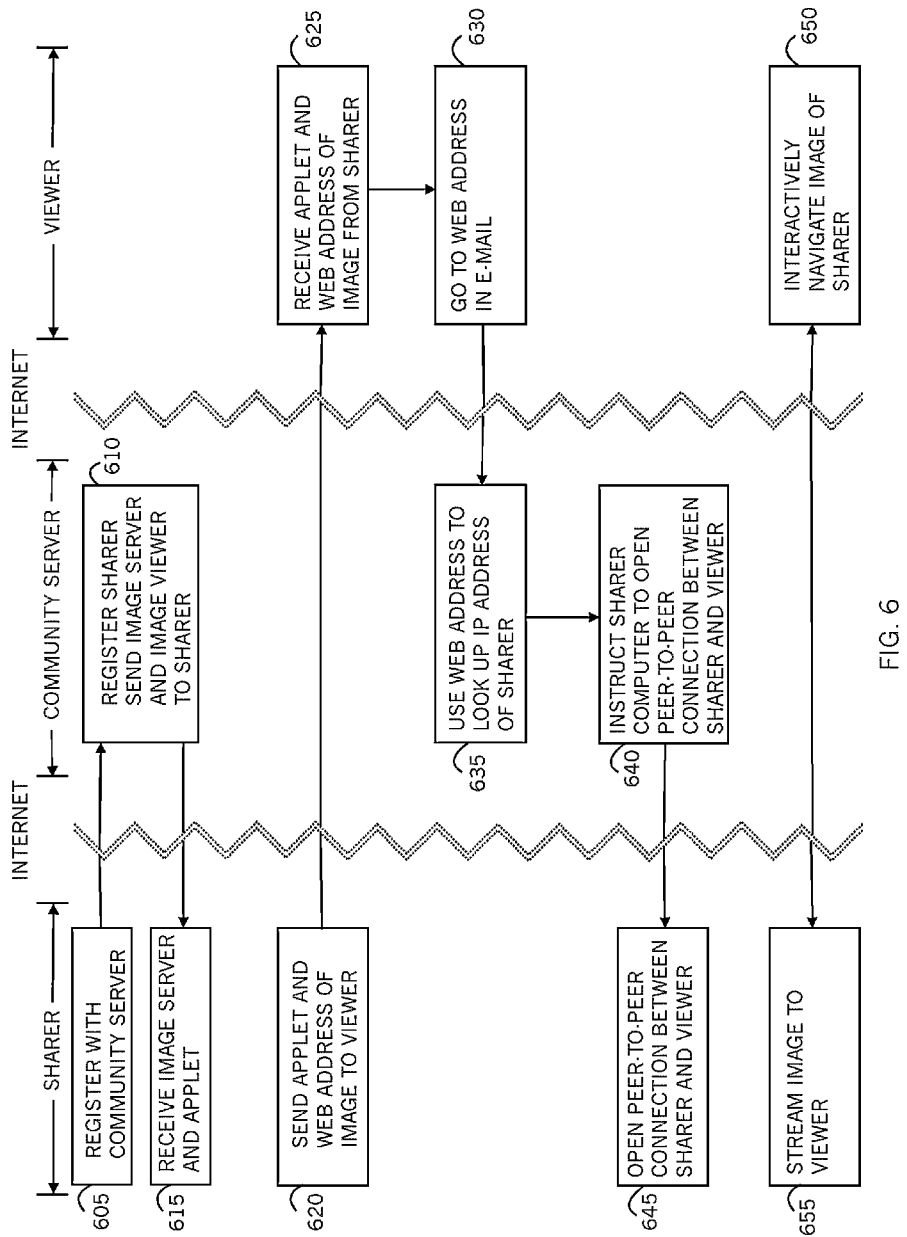
FIG. 6 is a simplified flowchart of a method for peer-to-peer image streaming, in accordance with a preferred embodiment of the present invention.

Reference is now made to FIG. 6, which is a simplified flowchart of a method for peer-to-peer image streaming, in accordance with a preferred embodiment of the present invention. FIG. 6 is divided into three columns. The leftmost column indicates steps performed by a sharer computer, such as sharer computer 110 (FIG. 1). The middle column indicates steps performed by a community server, such as community server 170. The rightmost column indicates steps performed by a viewer computer, such as viewed computer 130. Preferably, the sharer computer, the viewer computer and the community server are connected by a computer network, such as the Internet.

At step 605, sharer computer registers with the community server. By registering with community server, the sharer computer can be identified by the server computer whenever it connects to the network. At step 610, the community server sends a peer-to-peer image server, such as peer-to-peer image server 120 (FIG. 1), and a viewer applet, such as peer-to-peer image viewer 140, to the sharer computer. At step 615 the sharer computer receives the image server and the applet.

At step 620 the sharer computer sends a message to the viewer computer advising of one or more images to be shared for interactive viewing. The message includes one or more web addresses for images to be viewed. In addition, the message contains a peer-to-peer image viewer applet, to be installed on the viewer computer. At step 625 the viewer computer receives the one or more web addresses and the viewer applet from the sharer computer. If the peer-to-peer image viewer applet is not already installed on the viewer computer, the viewer computer installs the applet received from the sharer computer. The one or more web addresses in the message do not point directly to sharer computer. Instead they point to the community server. When the viewer computer browses the one or more web addresses at step 630, the community server looks up the IP address of sharer computer, based on the one or more web addresses at step 635. At step 640 the community server instructs the sharer computer to open a peer-to-peer socket connection with the viewer computer, and directs the viewer computer to the sharer computer. At step 645 the sharer computer opens a per-to-peer socket connection with the viewer computer. At step 650 the viewer computer interactively views images on the sharer computer, and at step 655 the sharer computer streams image data to the viewer computer as required.

It may be appreciated by those skilled in the art that the method depicted in FIG. 6 corresponds to the system embodiment illustrated in FIG. 1, and that figures similar to FIG. 6 can be generated to correspond to the alternative system embodiments of FIG. 2-5.

It may also be appreciated by those skilled in the art that in addition to interactive viewing of the images shared by the sharer, the sharer may also enable the viewer to perform other actions, such as printing shared images, editing shared images, downloading shared images and posting shared images on a website.

Implementation Details

"Image streaming" refers to on demand delivery of image data in response to a user's interactive navigation of a large image. High quality images are too large to view in their entirety within a view window on a computer screen, at full resolution. Instead, a user can either view an entire image within the view window at a low resolution, or view a portion of the image within the view window at a higher resolution. A user can choose to "pan" and "zoom" within an image in order to inspect the image. Panning corresponds to moving a view window within the image (left, right, up and down) at a fixed resolution, and zooming corresponds to scaling the image up (magnification) or down (reduction) in resolution. As a user zooms into higher and higher resolutions of an image, the relative portion of the image that can be displayed within a view window decreases.

Instead of sending the entire image data from a server to a client computer, and requiring a user to wait the time of the download before being able to view the image, image streaming operates by sending only the data required to display in the view window the specific image portion at the specific resolution requested by the user. Image streaming is distinct from audio and video streaming in many ways.

Static vs. Dynamic Content: When playing a dynamic audio segment or watching a dynamic video segment, a user typically makes one pass through the media in a play mode. It is not typical for a user to recurrently move back and forth within an audio or video segment. However, when interactively inspecting a static high resolution image, a user typically does come back to the same image data; for example, by zooming in and out, or panning left and right.

Resolution: Video frames are generally of low enough resolution to fit entirely within a view window. Zooming into a single frame image within a video segment generally leads to pixelization, or a similar effect caused by magnifying an image beyond its original resolution.

Mega-Pixel Digital Cameras: Image streaming is a newer technology than video and audio streaming, arising from the emergence of high resolution multi-mega-pixel digital cameras in the consumer market. E-commerce sites are now able to acquire compelling high resolution images of merchandise. Consumers are now able to share high resolution images.

Figure 7:
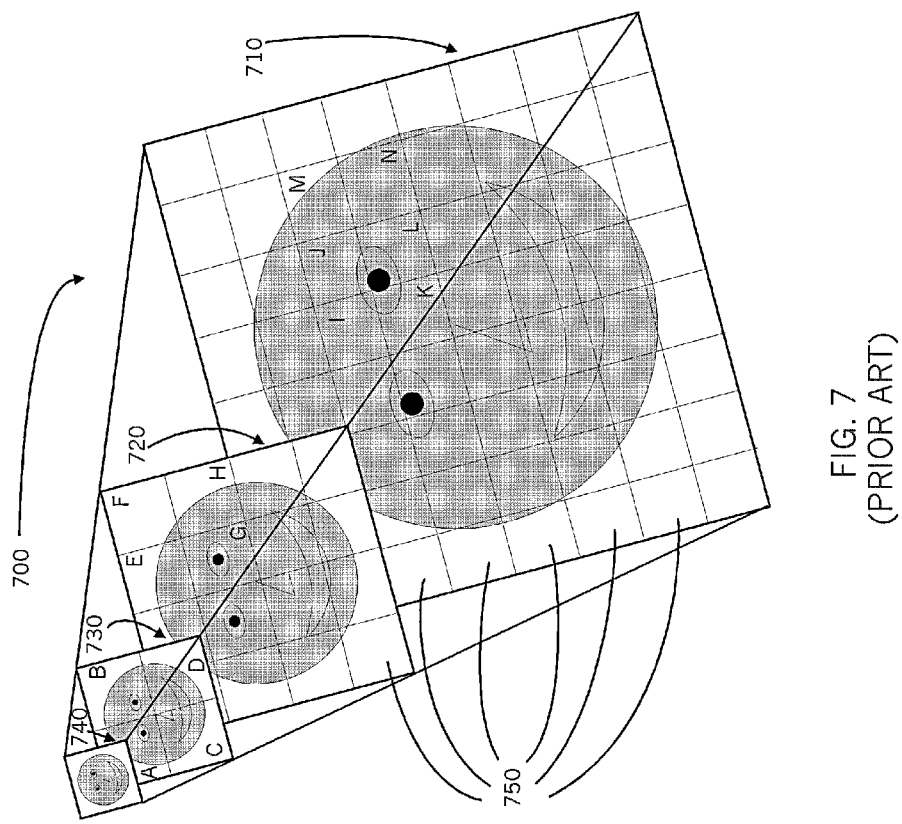
FIG. 7 is a simplified sketch of a prior art multi-resolution tiled image format depicted in the form of an image pyramid.

Reference is now made to FIG. 7, which is a simplified sketch of a prior art multi-resolution tiled image format depicted in the form of an image pyramid 700. An example of a multi-resolution tiled image format is the FLASHPIX® image format. FLASHIX® is a registered trademark of the Digital Imaging Group, and the specification for the FLASH-PIX® format is available for download at http://www.digital-imaging.org.

Shown in FIG. 7 is a digital image 710 located at the bottom of image pyramid 700. Above image 710 in the pyramid are lower resolution sub-sampled versions of image 710, each version having half the pixel dimensions of the version below it. Thus, assuming that image 710 is 512×512 pixels, an image 720 is generated from image 710 by sub-sampling down to 256×256 pixels. An image 730 is generated from either image 710 or image 720 be sub-sampling down to 128×128 pixels, and finally an image 740 is generated from either image 710, image 720 and image 730 be sampling all the way down to 64×64 pixels.

Each of the images 710, 720, 730 and 740 in the pyramid are shown divided up into regions 750 called "tiles." Consistent with the dimensions above, an individual tile is a 64×64 block of pixels. Thus image 710 has an array of 8×8 tiles, image 720 has an array of 4×4 tiles, image 730 has an array of 2×2 tiles, and image 750 is a single tile.

In a preferred embodiment of the present invention, image pyramid 700 is stored and accessed by a peer-to-peer image server. As a viewer interactively navigates the image, appropriate tiles from pyramid 700 are transmitted by an image server to the viewer. Assuming, for example, that the viewer has a 128×128 viewing window, an initial low-resolution view of the entire image can be sent by the peer-to-peer image server, by delivering to the viewer tiles labeled A, B, C and D; namely, the tiles from image 730.

If the viewer requests to zoom into the top right portion of image 730; i.e., into tile B, then the four image tiles labeled E, F, G and H from the next layer are delivered to the viewer by the peer-to-peer image server. Only the top right quadrant of image 720 can be viewed within the viewer's 128×128 pixel view window. However, the user sees more detail from image 720 than could be seen from image 730. The effect of replacing tiles A, B, C and D with tiles E, F, G and H within the view window appears to the viewer as a zoom-in, or magnification.

If the viewer subsequently requests to zoom into the bottom left portion of the image in the view window; i.e., into tile G, then the four image tiles labeled I, J, K and L from the next layer are delivered to the viewer by the peer-to-peer image server. Only the four tiles I, J, K and L from image 710 can be viewed within the viewer's 128×128 pixel view window. However, the user sees more detail from image 710 than could be seen from image 720. The effect of replacing tiles E, F, G and H with tiles I, J, K and L within the view window appears to the viewer as a further zoom-in.

If the viewer subsequently requests to pan to the right, then the additional tiles M and N from image 710 are delivered to the viewer by the peer-to-peer image server, so that the four tiles J, M, L and N can be displayed. The effect of replacing tiles I, J, K and L with tiles J, M, L and N within the view window appears to the viewer as if the view windows has moved to the right within image 710. It is not necessary for the peer-to-peer image server to deliver tiles J and L when the viewer pans to the right, since these tiles were previously delivered and are preferably available in a local cache.

Further details of image streaming and tile caching can be found in applicant's U.S. Pat. No. 5,968,120 entitled "METHOD AND SYSTEM FOR PROVIDING ON-LINE INTERACTIVE DISPLAY OF DIGITAL IMAGE STORED AS TILES AT PLURALITY OF RESOLUTIONS OVER A SERVER-CLIENT NETWORK;" U.S. Pat. No. 6,121,970 entitled "A METHOD AND SYSTEM FOR HTML-DRIVEN INTERACTIVE IMAGE CLIENT;" and U.S. Pat. No. 6,148,333 entitled "METHOD AND SYSTEM FOR SERVER ACCESS CONTROL AND TRACKING."

User Interface

Figure 8B:
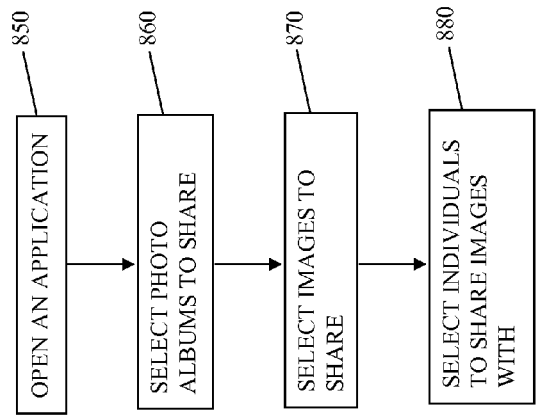
FIG. 8B is a simplified flow chart of a usage workflow for sharing images, in accordance with a preferred embodiment of the present invention.
Figure 8A:
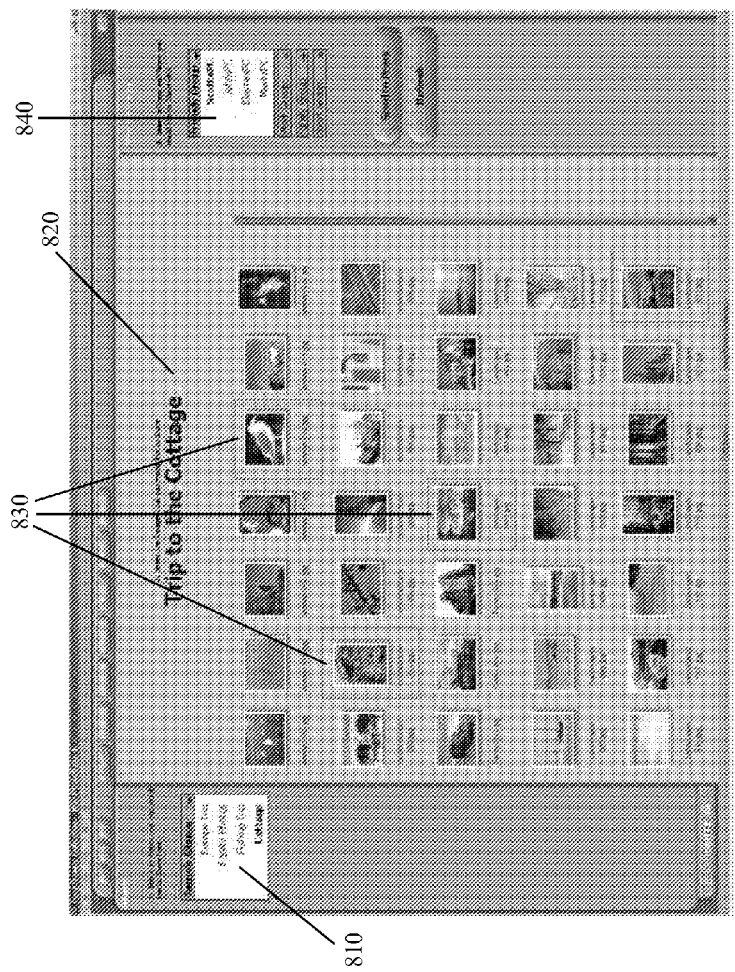
FIG. 8A is an illustration of a sample user interface for peer-to-peer image sharing, in accordance with a preferred embodiment of the present invention.

Reference is now made to FIG. 8A, which is an illustration of a sample user interface for peer-to-peer image sharing, in accordance with a preferred embodiment of the present invention. Shown in FIG. 8A is a list 810 of a user's photo albums. The user preferably selects one or more photo albums, such as the "Trip to the Cottage" album 820. Album 820 preferably contains a plurality of images related to the "Trip to the Cottage" theme.

The user preferably selects one or more images from album 820, such as images 830, to share with other people. The user also preferably selects peers with whom to share the selected images, from a list 840 of groups of people and individual people.

Reference is now made to FIG. 8B, which is a simplified flow chart of a usage workflow for sharing images, in accordance with a preferred embodiment of the present invention. At step 850 a user who wishes to share his photos opens a multimedia content organization application, such as applicant's PHOTOSUITE® software program. At step 860 the user selects one or more albums. At step 870 the user selects one or more images from each of the selected albums to share with people. At step 880 the user selects groups of people and individual people, with whom to share the selected images.

Figure 9B:
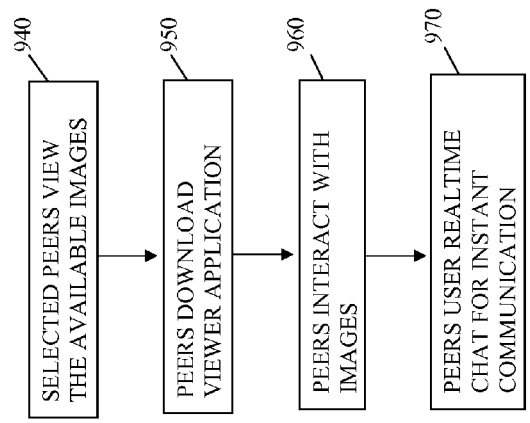
FIG. 9B is a simplified flow chart of a usage workflow for viewing shared images, in accordance with a preferred embodiment of the present invention.
Figure 9A:
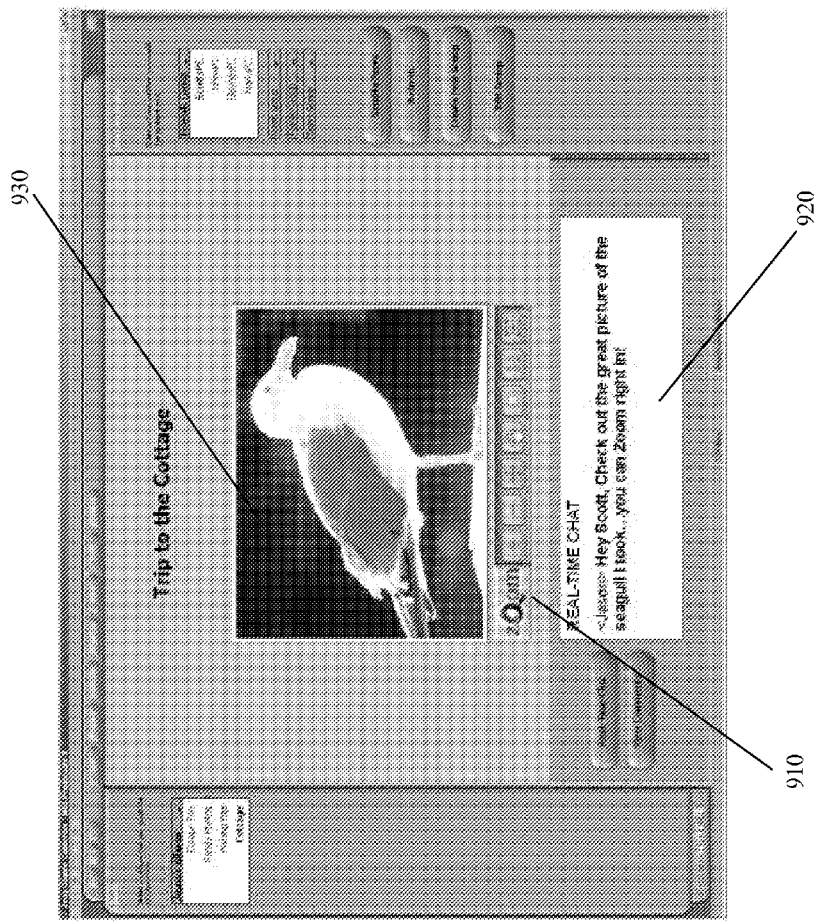
FIG. 9A is an illustration of a sample user interface for peer-to-peer viewing of shared images, in accordance with a preferred embodiment of the present invention.

Reference is now made to FIG. 9A, which is an illustration of a sample user interface for peer-to-peer viewing of shared images, in accordance with a preferred embodiment of the present invention. Shown within FIG. 9A is a user interface 910 for viewing a shared image 920, which is preferably one of shared images 830 (FIG. 8A). Also shown within FIG. 9A is a chat application 930, enabling people to view shared images and chat simultaneously.

Reference is now made to FIG. 9B, which is a simplified flow chart of a usage workflow for viewing shared images, in accordance with a preferred embodiment of the present invention. At step 940 a user sees one or more available shared images. At step 950 the user downloads a viewer application for interactively viewing shared images, such as the application depicted with user interface 910 (FIG. 9A). If the viewer application is already resident on the user's computer, then step 950 can be skipped. At step 960 the user uses the viewer application to interactively views one or more shared images, such as shared images 830 (FIG. 8A). At step 970 the user uses an instant communication tool for real-time char with other people who are viewing the shared images.

Figure 10:
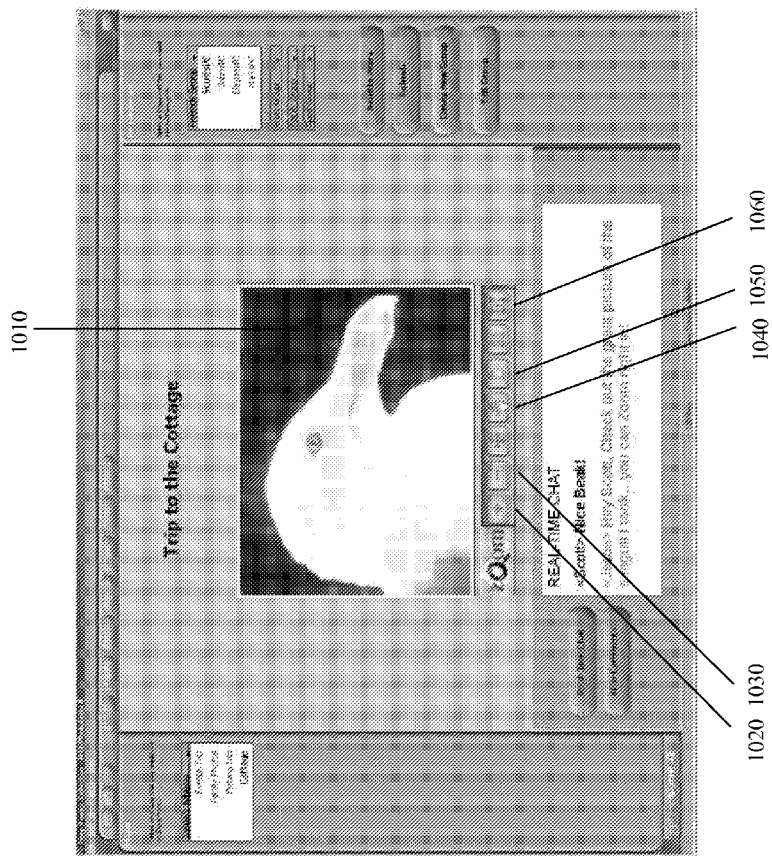
FIG. 10 is an illustration of interactive viewing of a shared image, by using zoom and pan navigational functionality.

Reference is now made to FIG. 10, which is an illustration of interactive viewing of a shared image, by using zoom and pan navigational functionality. Shown in FIG. 10A is a magnified portion 1010 of image 920, obtained when a user uses button 1020 to zoom into image 920. Button 1030 is used to zoom out of image portion 1010, and button 1040 is used to pan image portion 1010 in the four compass directions (north, east, south and west). Button 1050 is used to obtain information about image 920, and button 1060 is used to reset the displayed image portion to the initial image 920.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

What is claimed is:

1. A peer-to-peer image streaming system comprising:

a sharer computer, a viewer computer and a community server interconnected via a communication network, wherein the sharer computer notifies the community server of an assigned IP address associated with the sharer computer whenever the sharer computer connects to the network, and wherein the sharer computer includes: (i) an image store storing digital images, (it) a transmitter for sending an electronic message over the network to the viewer computer, wherein the message includes a web address pointing to the community server and information identifying the image store, and (iii) a peer-to-peer image streamer streaming image data over a network;

the viewer computer includes: (i) a transceiver receiving the message from the sharer computer and connecting the viewer computer to the web address specified in the message, and (ii) a peer-to-peer image viewer viewing image data over the network; and the community server includes: (i) a look-up table listing current IP addresses for registered peer-to-peer image servers, (ii) an address translator looking up a network address of the image store based on the image store identification information in the message transmitted by the sharer computer, and (iii) a peer-to-peer network connector instructing the peer-to-peer image streamer to open a direct peer-to-peer socket connection with the viewer computer, wherein the sharer computer sends to the viewer computer the electronic message comprising the web address which points to the community server, the viewer computer utilizes the transceiver to browse the web address and connects to the community server, the community server looks up the assigned IP address of the sharer computer from the said look-up table based on the web address, the community server instructs the sharer computer to open a peer-to-peer connection with the viewer computer and directs the viewer computer to the sharer computer, the sharer computers opens a peer-to-peer connection with the viewer computer and transmits images from the image store to the viewer computer, whereby the viewer computer views the images from the image store associated with the sharer computer without requiring the viewer computer to register with the community server or search for images thereon.

2. The system of claim 1, wherein the image store identification information includes an alias for the peer-to-peer image server, rather than a direct identifier.

3. The system of claim 1, wherein said community server updates said look-up table when it receives a new IP address for a registered peer-to-peer sharer computer.

4. The system of claim 3 wherein the web address includes an identity of said peer-to-peer image server.

5. The system of claim 4 wherein said address translator looks, up an IP address from said look-up table, based on the identity of said peer-to-peer image server in the web address.

* * * * *